US007542962B2

(12) United States Patent
Finlay et al.

(10) Patent No.: US 7,542,962 B2
(45) Date of Patent: Jun. 2, 2009

(54) INFORMATION RETRIEVAL METHOD FOR OPTIMIZING QUERIES HAVING MAXIMUM OR MINIMUM FUNCTION AGGREGATION PREDICATES

(75) Inventors: Ian Richard Finlay, Uxbridge (CA); Gary Valentin, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 10/427,772

(22) Filed: Apr. 30, 2003

(65) Prior Publication Data

US 2004/0220908 A1 Nov. 4, 2004

(51) Int. Cl.
*G06F 7/00* (2006.01)
*G06F 17/30* (2006.01)

(52) U.S. Cl. .................................. 707/2; 707/1; 707/3

(58) Field of Classification Search ............... 707/3, 707/4, 7, 1; 705/10
See application file for complete search history.

(56) References Cited

U.S. PATENT DOCUMENTS

| | | | | |
|---|---|---|---|---|
| 5,590,324 A * | 12/1996 | Leung et al. | ................ | 707/5 |
| 5,668,987 A | 9/1997 | Schneider | .............. | 395/603 |
| 5,758,146 A * | 5/1998 | Schiefer et al. | ............. | 707/2 |
| 5,822,749 A | 10/1998 | Agarwal | .................. | 707/2 |
| 5,822,750 A | 10/1998 | Jou et al. | .................. | 707/2 |
| 5,913,206 A | 6/1999 | Chaudhuri et al. | ............. | 707/2 |
| 5,926,820 A * | 7/1999 | Agrawal et al. | ........... | 707/200 |
| 5,960,428 A | 9/1999 | Lindsay et al. | ............. | 707/4 |
| 5,978,792 A | 11/1999 | Bhargava et al. | ............ | 707/2 |
| 6,052,681 A | 4/2000 | Harvey | .................. | 707/3 |
| 6,092,062 A | 7/2000 | Lohman et al. | ............. | 707/2 |
| 6,144,957 A | 11/2000 | Cohen et al. | ............... | 707/3 |
| 6,205,453 B1 | 3/2001 | Tucker et al. | ............. | 707/503 |
| 6,275,818 B1 | 8/2001 | Subramanian et al. | ......... | 707/2 |
| 6,341,281 B1 | 1/2002 | MacNicol et al. | ............. | 707/3 |
| 6,487,546 B1 * | 11/2002 | Witkowski | ................. | 707/1 |
| 6,947,934 B1 * | 9/2005 | Chen et al. | ................. | 707/7 |

OTHER PUBLICATIONS

Kinariwala et al., "Programming in C", University of Hawaii, Chapter 10, Section 10.2.1, Found At: http://www-ee.eng.hawaii.edu/Courses/EE150/Book/chap10/subsection2.1.2.1.html, Last Updated: Aug. 16, 1994, Accessed: Oct. 11, 2005.*

(Continued)

*Primary Examiner*—Christian P. Chace
*Assistant Examiner*—Michael J Hicks
(74) *Attorney, Agent, or Firm*—Kunzler & McKenzie

(57) ABSTRACT

In an information retrieval system, a query optimization method transforms maximum or minimum function aggregation predicates on a non-indexed column into a single sort function. The method evaluates the query to identify a table and a predicate equating a column of the table to a sub-query that applies a maximum or minimum aggregation function to the column to return an aggregate value for the column. The aggregate value is used for selecting rows from the table to produce a query result. A determination is then made whether an index has not been created using the column of the table. In response to these steps of evaluating and determining, the method reforms the query as a sort function on the column. The sort function scans the table once to provide the query result.

7 Claims, 6 Drawing Sheets

OTHER PUBLICATIONS

Claussen et al., "Exploiting early sorting and early partitioning for decision support query processing", The VLDB Journal (2000) 9: pp. 190-213, Springer-Verlag, 2000.*

Zhang et al., "Improving Min/Max Aggregation over Spatial Objects", Proc. of 9th ACM International Symposium on Advances in Geographic Information Systems (GIS), Atlanta, Georgia, 2001.*

Natsev et al., "Aggregate Predicate Support in DBMS", Proceedings of the 13th Australasian Database Conference (ADC '02), Melbourne, Australia, Jan. 2002; Published in Conferences in Research and Practice in Information Technology, vol. 5.*

Cole et al., "Query Processing in the IBM Application System/400", Bulletin of the Technical Committee on Data Engineering, vol. 4 No. 16, Dec. 1993, pp. 18-27, IEEE.*

J. Heinicke, "Re: Max value from a table," available at http://sources.redhat.com/ml/xsl-list/2001-10/msg01342.html, on Sep. 8, 2003.

"Non-Cost-Based Optimizations," available at http://www.cloudscape.com/docs/doc_30/html/coredocs/optimize.htm, on Feb. 8, 2002.

"Listing 3: An example of a query using poor join construction," available at http://www.inquiry.com/techtips/db2_pro/10min1101/listing6.asp, on Apr. 24, 2003.

Naren Chintala, "SQL Quiz," available at http://www.arikaplan.com/oracle/ari10698c.html, on Apr. 24, 2003.

C. Gan et al., "Adaptive Path Selection for Query with Input Variables," IBM Technical Disclosure Bulletin, vol. 32, No. 4A, Sep. 1989, pp. 265-267.

Y. Lee, et al., "Adaptive Selection of Access Path and Join Method," pp. 250-256, available on Sep. 18, 2003.

Lin Chao, "Which is faster *table* *scan* or *index* access﹖" Inspec Abstract No. C2001-11-6160-017, Mini-Micro Systems, vol. 22, No. 9, pp. 1144-1146.

* cited by examiner

INFORMATION RETRIEVAL METHOD FOR OPTIMIZING QUERIES HAVING MAXIMUM OR MINIMUM FUNCTION AGGREGATION PREDICATES

FIELD OF THE INVENTION

This invention relates generally to information retrieval systems and, more particularly, to information retrieval systems adapted to optimize queries having maximum or minimum function aggregation predicates.

BACKGROUND OF THE INVENTION

One common form of information retrieval system for computerized record keeping is a database management system (such as DB2™ Universal Database Management System sold by IBM™). Between the actual database (i.e. the data as stored for use by a computer) and the users of the system is a software layer known as a relational database management system ("RDBMS" or "DBMS"). The DBMS is responsible for handling database transactions (such as database queries or simply 'queries', table updates, table indexes, table deletes, etc.) thus shielding users from the details of any specific computer hardware or database implementation. Using relational techniques, the DBMS stores, manipulates and retrieves data in the form of table-like relations typically defined by a set of columns or attributes of data types and a set of rows (i.e. records or tuples) of data. The columns may further comprise restrictions on their data content (i.e. valid domains) and may be designated as a primary key or unique identifier for the relation or a foreign key for one or more other relations.

The standard database query language for dealing with relational databases implemented by most commercial DBMSs is the Structured Query Language ("SQL"). SQL comprises both data definition operations and data manipulation operations. To maintain data independence, a query (i.e. a set of SQL commands) instructs the DBMS what to do but not how to do it. Thus, the DBMS comprises a query processor for generating various query plans of execution and choosing the least expensive plan with respect to execution costs. Due to the high-level nature of relational expressions and a variety of implementation techniques, automatic query optimization is possible and often necessary to ensure more efficient query processing.

In accordance with well-known query translation processes, an SQL query is processed in stages. For example, an initial stage may cast the source query into an internal form or model following the preliminary steps of lexing, parsing and semantic checking. One example of an internal form or model is query Graph Model (QGM). The goal of this model is to provide a more manageable representation of queries to reduce the complexity of query compilation and optimization. The internal model is a data structure for providing the semantic relationships of the query. These semantic relationships are used by the query translator and optimizer components to rewrite the query in a canonical form. In a next phase, a plan optimizer produces a query execution plan such as by generating alternate plans and choosing a best plan based on estimated execution costs. A plan refinement stage may then be employed to refine the optimum execution plan in accordance with run-time requirements.

Queries may involve "aggregation". Aggregation occurs where the desired information is not an attribute of a single tuple, but is rather the result of applying a function over multiple tuples. Examples of aggregation functions comprise minimum ("MIN"), maximum ("MAX"), and average ("AVG"). In SQL, the functions MIN, MAX, and AVG are column functions. As such, they operate on a set of values in a column to derive a single result value. In particular, the function MIN returns the smallest value in a column or set of values. The function MAX returns the largest value in a column or set of values. The function AVG returns the sum of the values in a column divided by the number of values in that column. Predicates that involve an aggregated attribute are referenced as aggregation predicates. In general, a predicate specifies a condition that is true, false, or unknown with respect to a given row in a database table.

The solution to a query often involves the intermediate step of solving one or more sub-queries that comprise aggregation predicates. In advanced database applications such as decision-support systems, queries can become very complex due to their dependency on many sub-queries and views. Aggregation predicates are important in these large database applications. Complex decision-support queries may have to retrieve data by applying one or more different aggregation functions on a number of base relations and then applying many predicates on the aggregation views. While aggregation renders query optimization with known techniques difficult and in many cases impossible, aggregation is necessary and optimization of aggregation queries, which may entail manipulating aggregation predicates, is critical for large-scale systems.

Consider the following example of the use of a MAX function aggregation predicate in a simple query:

```
CREATE TABLE T1(C1 INT, C2 INT, C3 INT)
SELECT C1, C2, C3 FROM T1
    WHERE C1 = (SELECT MAX(C1) FROM T1)
```

In the above example, the SQL "CREATE TABLE" statement is used to create a base table T1 410 having three integer valued columns C1, C2, and C3. In general, a SELECT query in SQL may have a SELECT clause (or list), a FROM clause, and a SELECT clause. The SELECT clause indicates the columns from which the data responsive to the query may be found. The FROM clause indicates those tables from which the columns named in the SELECT clause may be found. The WHERE clause indicates the conditions to be applied to one or more of the columns named in the SELECT clause. In the above example, the SELECT clause returns a result table that comprises the rows of columns C1, C2, and C3 of table T1 where the value of column C1 is equal to the maximum value of C1 in table T1. The condition C1=(SELECT MAX(C1) FROM T1) is an aggregation predicate. In this example, the predicate comprises a sub-query, namely, SELECT MAX (C1) FROM T1.

The column function MAX is found in the WHERE clause as a sub-query as opposed to being directly implemented (e.g. WHERE C1=MAX(C1)). In SQL, column functions cannot be stated in a WHERE clause because of the order of operations. The WHERE clause may be thought of as being evaluated before the SELECT clause. Consequently, when the WHERE clause is being evaluated, the column function does not have access to the set of values. This set of values is selected at a later time by the SELECT clause. This restriction may, for example, limit the use of known query merging techniques for optimizing queries having aggregation predicates.

One disadvantage of present optimization methods is their inefficiency in optimizing queries having aggregation predicates. To process the SELECT query in the above example, a known DBMS may typically evaluate the aggregation sub-query prior to applying the result of this evaluation to the main query. To evaluate this query efficiently with current methods, an index on at least column C1 is required. The sub-query would generally be executed with an index scan or access and the main query would be executed subsequently. Thus, if an index on column C1 does not exist, the query may require two index or table scans to satisfy the query using present methods. This is often a computationally expensive operation. In general, when a table scan is performed all the rows in the subject table are examined, one by one, to find rows that satisfy the query. When an index scan is performed for a subject table having an index, index entries are examined to find row identifiers that are then used to retrieve rows that satisfy the query.

A need therefore exists for a system and associated method of optimizing SQL queries containing aggregation predicates such as maximum (MAX) and minimum (MIN) when an index does not exist on the subject column. Accordingly, a solution that addresses, at least in part, the above and other shortcomings is desired. The need for such system and method has heretofore remained unsatisfied.

SUMMARY OF THE INVENTION

The present invention satisfies this need, and presents a system, a computer program product, and an associated method (collectively referred to herein as "the system" or "the present system") for providing a query optimization method for transforming maximum or minimum function aggregation predicates on a non-indexed column into a single sort function. The method evaluates the query to identify a table and a predicate equating a column of the table to a sub-query that applies a maximum or minimum aggregation function to that column to return an aggregate value for that column. The aggregate value is used for selecting rows from the table to produce a query result. A determination is then made as to whether an index has not been created using the column of the table. In response to these steps of evaluating and determining, the method reforms the query as a sort function on the column. The sort function scans the table once to provide the query result.

The sort function comprises: comparing in accordance with the aggregation function a first column value and a second column value from the column of a first row and a second row respectively of the table. In addition, the sort function comprises selecting at least one of the first row or second row for the query result in response to the comparing.

The sort function further comprises: further comparing in accordance with the aggregation function a next column value from the column of a next row of the table and a query result column value from the column of a row of the query result; and, further selecting the next row to add to the query result or replace the query result in response to the comparing.

The method further comprises repeating the steps of further comparing and further selecting for any remaining next rows of the table.

The query comprises a selection list for choosing columns of the table to comprise in the query result. The selection list may comprise the column. The table may be a set of tuples.

In accordance with further aspects of the present invention there is provided an apparatus such as a query optimizer system and a database management system, a method for adapting a database management system, as well as articles of manufacture such as a computer readable medium having program instructions recorded thereon for practising the method of the present system.

Advantageously, to improve query processing efficiency, the present system can generate a query result for a query containing maximum or minimum aggregation predicates using a single table scan.

According to an embodiment of the present system, there is provided, for an information retrieval system, a method for optimizing a query comprising an aggregation function. The query is applied against a table having table columns and table rows, comprising applying the aggregation function to a table column for returning an aggregate value identifying a table row, and, producing a query result based on the identified table row.

According to another embodiment of the present system, there is provided a computer program product having a computer readable medium tangibly embodying computer executable code. The code directs an information retrieval system to optimize a query comprising an aggregation function. The query is applied against a table having table columns and table rows. The computer program product comprises code for applying the aggregation function to a table column for returning an aggregate value identifying a table row, and, code for producing a query result based on the identified table row.

According to another embodiment of the present system, there is provided an information retrieval system for optimizing a query comprising an aggregation function. The query is applied against a table having table columns and table rows. The information retrieval system comprises means for applying the aggregation function to a table column for returning an aggregate value identifying a table row, and means for producing a query result based on the identified table row.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following detailed description of the embodiments of the present invention does not limit the implementation of the invention to any particular computer programming language. The present invention may be implemented in any computer programming language provided that the OS (Operating System) provides the facilities that may support the requirements of the present invention. An embodiment is implemented in the C or C++ computer programming language (or other computer programming languages in conjunction with C/C++). Any limitations presented would be a result of a particular type of operating system or computer programming language and would not be a limitation of the present invention.

Figure 1:
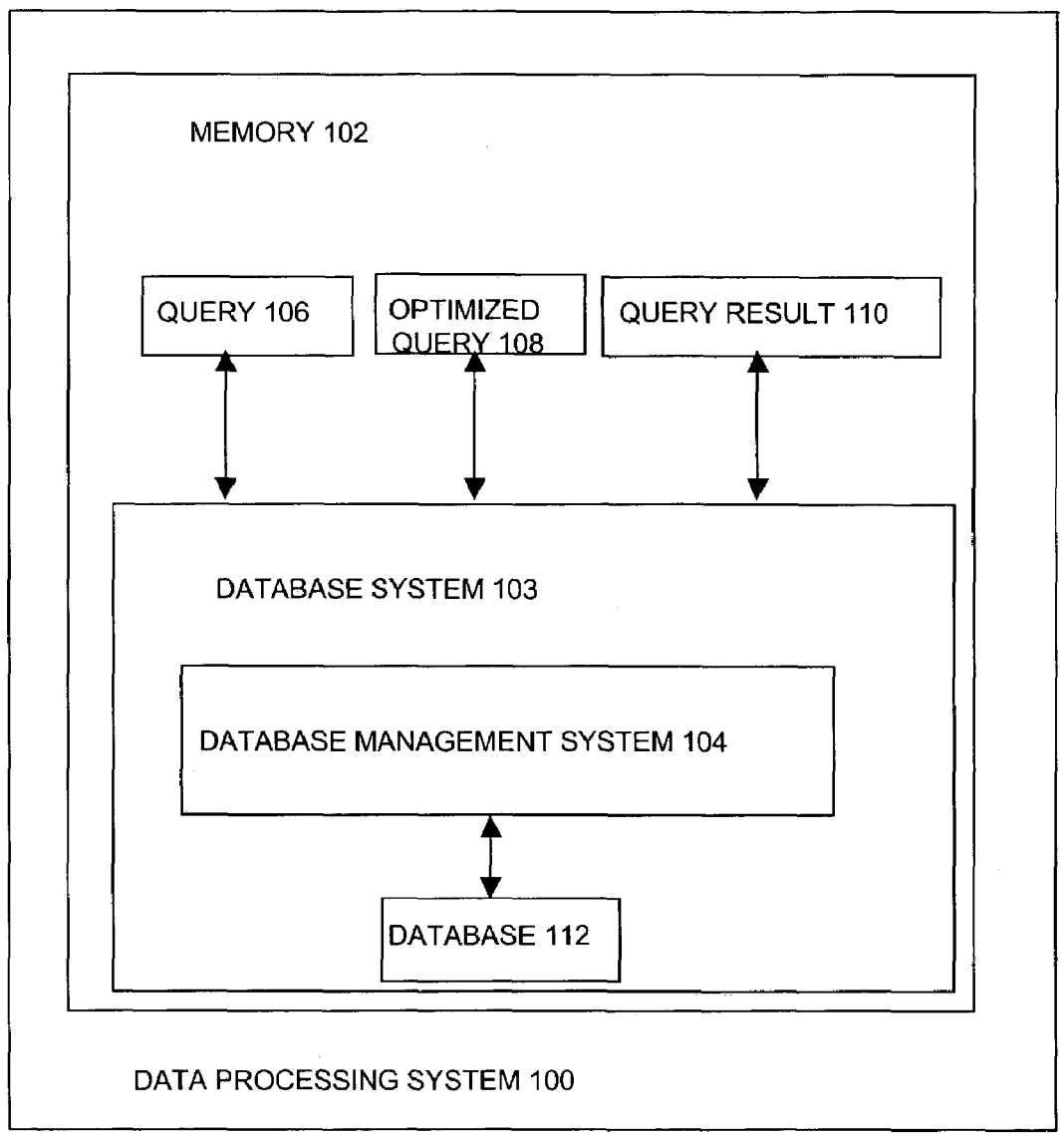
FIG. 1 is a block diagram illustrating an exemplary data processing system in which a query optimization process of the present invention can be used.

FIG. 1 shows a database system 103 that comprises a database management system (DBMS) 104 and a database 112. Database system 103 is stored in the memory 102 of a data processing system 100. The database system 103 may be shipped or installed without the database 112 to or by end users. In general, the DBMS 104 reads a query 106 provided by a user (via keyboard entry and the like). The DBMS 104 then executes the query 106 against the database 112 and provides a query result 110 to the user. However, to improve performance of query 106, the DBMS 104 is adapted by the present invention to transform the query 106 using a query optimization process into an optimized query 108, which the DBMS 104 then executes or applies against the database 112 to generate the query result 110.

The database system 103 may be stored in the memory 102 of the data processing system 100 or stored in a distributed data processing system (not depicted). The data processing system 100 comprises a central processing unit ("CPU") (not depicted) operatively coupled to memory 102 that also stores an operating system (not depicted) for general management of the data processing system 100. An example of a suitable data processing system 100 is the IBM™ ThinkPad™ computer. The database system 103 comprises computer executable programmed instructions for directing the data processing system 100 to implement the embodiments of the present invention. The programmed instructions may be embodied on a computer readable medium (such as a CD disk or floppy disk) that may be used for transporting the programmed instructions to the memory 102 of data processing system 100. Alternatively, the programmed instructions may be embedded in a computer-readable, signal-bearing medium that is uploaded to a network by a vendor or supplier of the programmed instructions. This signal-bearing medium may be downloaded to the data processing system 100 from the network (not depicted) by end users or potential buyers.

The CPU of the data processing system 100 is typically coupled to one or more devices (not depicted) for receiving user queries and for displaying the results of the queries. User queries typically comprise a combination of SQL commands for producing one or more tables of output data. The CPU is coupled to memory 102 for containing programs such as DBMS 104 and data in database 112 such as base tables or virtual tables such as views or derived tables (i.e. tables determined from one or more base tables according to CREATE VIEW or other statements). The memory 102 may comprise a variety of storage devices such as internal memory and external mass storage typically arranged in a hierarchy of storage as understood to those skilled in the art.

The database system 103 comprises a control program for managing the components of the database system 103. The components comprise a component for receiving a query 106 from a user and a component for processing the query 106 typically in accordance with a query optimization process that may comprise a query model (e.g. QGM). Additional components perform query plan determination comprising generating, costing and selecting a plan as well as eventual plan execution.

Figure 2:
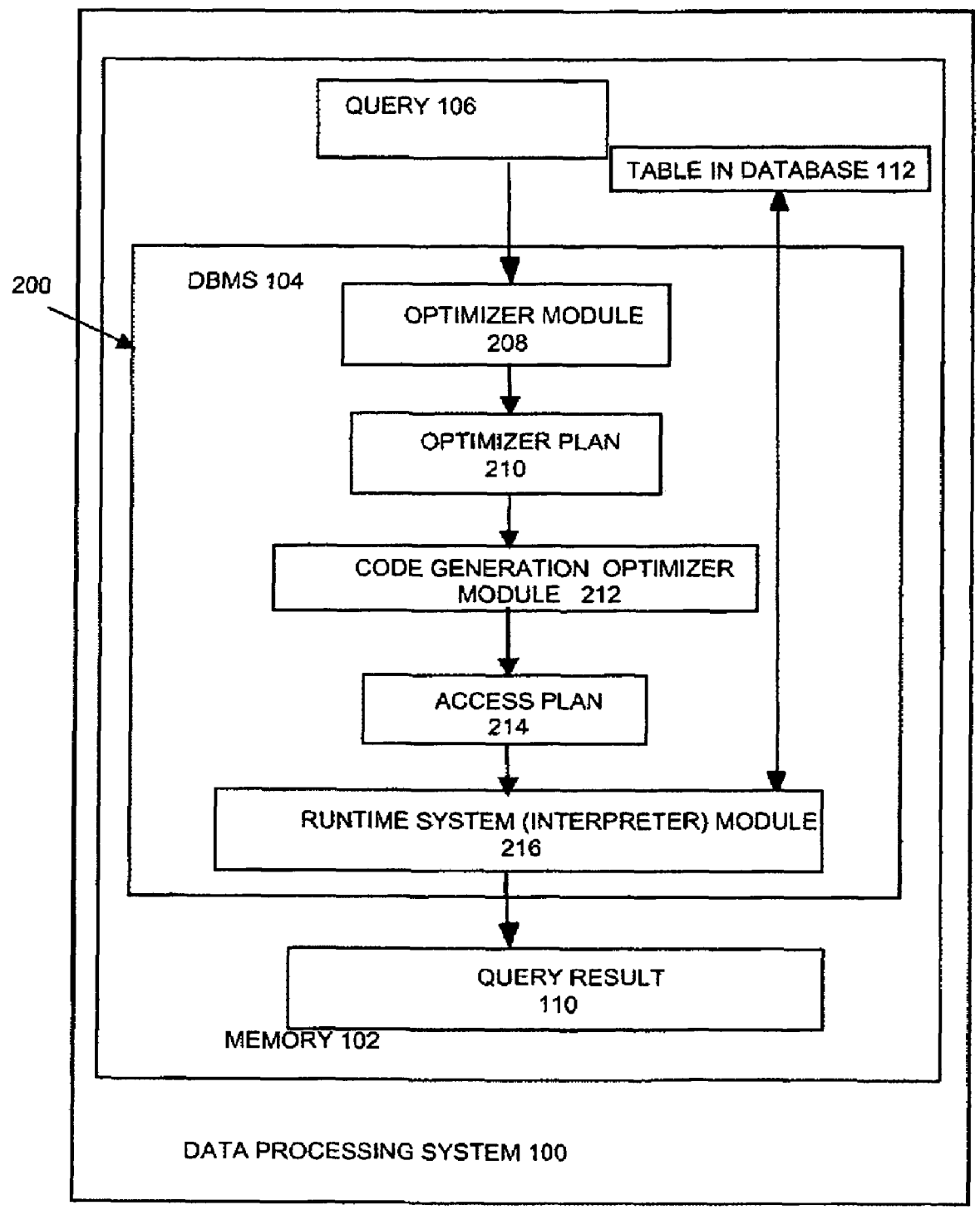
FIG. 2 is a block diagram illustrating a query optimization process within a database management system of FIG. 1.

FIG. 2 is a block diagram illustrating a query optimization process 200 within a DBMS 104 in accordance with an embodiment of the invention. The query optimization process 200 comprises a software programming code or computer program product that is typically embedded within, or installed on a computer. Alternatively, the query optimization process 200 can be saved on a suitable storage medium such as a diskette, a CD, a hard drive, or like devices. In general, the query optimization process 200 employs several software modules comprising an optimizer module 208, a code generation optimizer module 212, and a runtime system (interpreter) module 216. The optimizer module 208 reads the original query 106 and generates an optimizer plan 210 representing the optimized query 108. The code generation optimizer module 212 reads the optimizer plan 210 and generates an access plan 214. The runtime system (interpreter) module 216 reads the access plan 214, accesses the appropriate table in database 112, and subsequently generates the query result 110.

Consider again the above example of the use of an aggregation function in the sub-query of a simple query 106:

```
CREATE TABLE T1(C1 INT, C2 INT, C3 INT)
SELECT C1, C2, C3 FROM T1
    WHERE C1 = (SELECT MAX(C1) FROM T1)
```

The main SELECT query in the above example may be considered as an original query 106. The goal of the query optimization process 200 is to transform this original query 106 into an optimized query 108 to improve processing efficiency. As mentioned above, if no index exists on the operand column C1 of the aggregation function MAX in the sub-query of the aggregation predicate C1=(SELECT MAX(C1) FROM T1), a typical known optimization process may generally require the performance of two index or table scans to produce a query result 110 for the query 106. For example, according to known processes, a first table scan would be performed on the table T1 to find the aggregate value MAX (C1) in the operand column C1. A second table scan would then be performed on the table T1 to facilitate sort and group-by operations allowing the result of the first table scan to be joined (e.g. nested loop join or NLJN). The results of the second table scan produces the desired query result 110.

Figure 3:
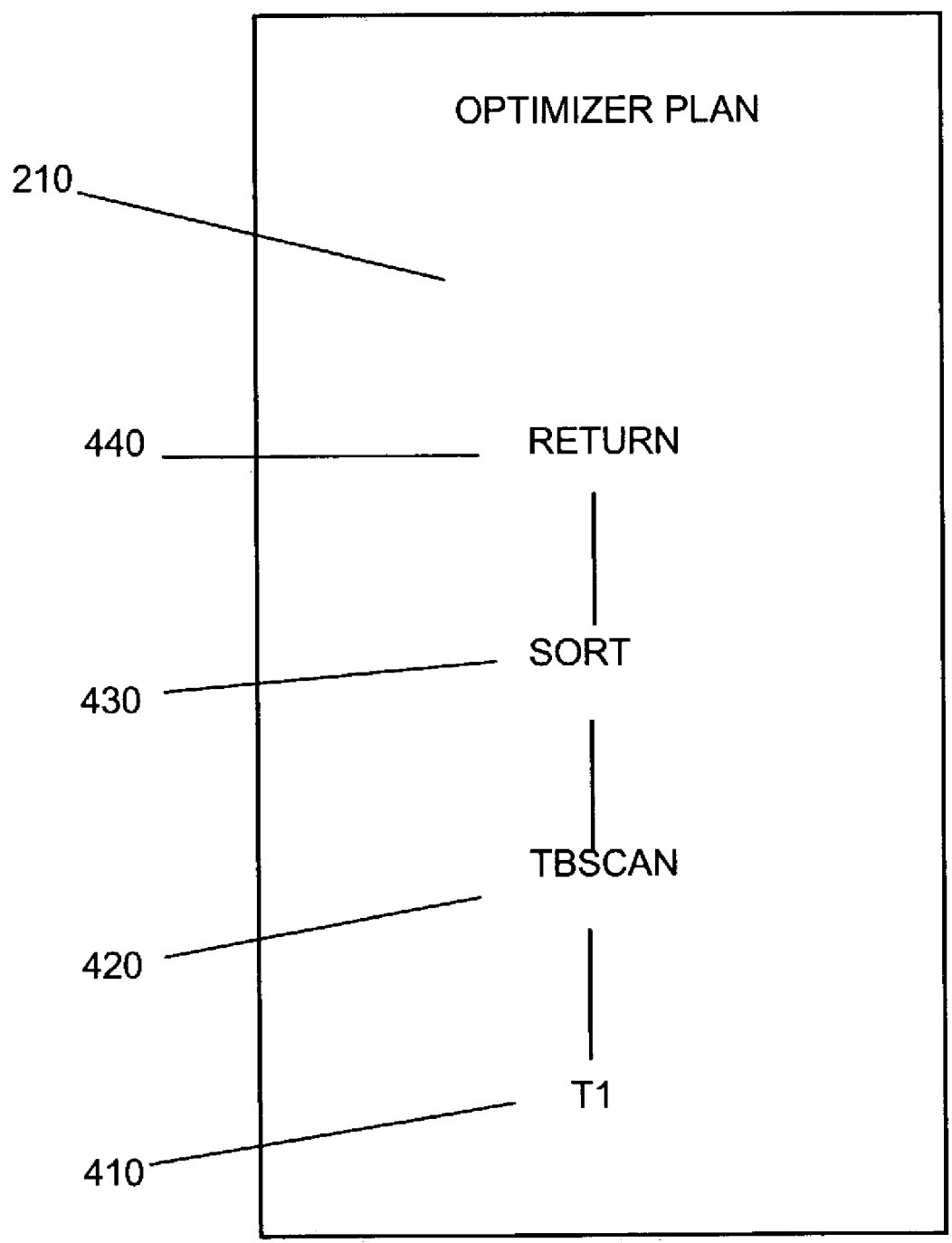
FIG. 3 is an optimizer plan for a query containing an aggregation predicate created by a optimizer module in accordance with the query optimization process of FIG. 1.

FIG. 3 is an optimizer plan 210 for a query 106 containing an aggregation predicate created by an optimizer module 208 in accordance with an embodiment of the invention. According to the present invention, if no index exists on the operand column C1 of the aggregation function MAX in the sub-query of the aggregation predicate C1=(SELECT MAX(C1) FROM T1), a single index or table scan can be used to produce a query result 110 for the query 106. In FIG. 3, a single table scan (TBSCAN) 420 is performed on the table T1 410 to facilitate a sort function (SORT 430) to produce the desired query result 110 (RETURN 440). Advantageously, the present invention requires only one table scan 420 (or index scan) and no group-by or join operations.

The query optimization process 200 transforms the original query 106 by effectively collapsing the sub-query of the aggregation predicate. This is accomplished by an access plan 214 that is processed by the runtime system (interpreter) module 216 to sort 430 the table T1 410. Beginning with the first row R1 of the table T1 410, a current maximum value for the column C1 is set as the value of the column C1 for the first row R1. The query result 110 corresponding to the current maximum value is temporarily stored as the current query result 110. Considering the second row R2 of the table T1 410, the current maximum value is compared to the value of the column C1 for that second row R2. If the current maximum value is less than the value of the column C1 for that second row R2, then the current maximum value is replaced by the value of the column C1 for that second row R2. The current query result 110 is replaced by the query result 110 corresponding to the (new) current maximum value. Likewise, the remaining rows of the table T1 410 are scanned with the query result 110 being the last current query result 110. Of course, if the current maximum value equals the value of the column C1 for a given row, the current query result 110 may contain multiple rows. Thus, the sort 430 operation shown in FIG. 3 is similar to a single-pass bubble sort.

Using the query optimization process 200, the aggregation predicate containing query 106 is evaluated using a single table scan 420 (or index scan) by storing the result for a current maximum value and discarding intermediate results if a new maximum value is found. This reduces the number of table scans to a single table scan 420 and minimizes the storing of temporary tables. By temporarily storing the result that matches the current maximum and discarding that result in favor of a new maximum, the need to scan the table T1 410 twice is reduced thus saving processing time and/or database space. In the case of a more complex expression or sequence of predicates that result in a full table scan or an expensive fetch/index scan, these savings can be quite substantial. Consider the following example query:

```
CREATE VIEW TMP(CX, CY, SUM3) AS
    (SELECT C1, C2, SUM(C3) FROM T1
    WHERE C1 < 50 AND C2 > 50 GROUP BY C1, C2)
SELECT CX, CY, SUM3 FROM TMP
WHERE SUM3 = (SELECT MAX(SUM3) FROM TMP)
```

This more complex example comprises a computed value SUM3 in the aggregation predicate of the query 106. In this case, using the query optimization process 200 of the present invention, there is no need, as is done in known processes, to temporarily store the entire computed stream, search for the maximum, and then re-read the stream searching for just the maximum values. Rather, the sum of column C3 (i.e. SUM (C3)) can be computed for each of the column combinations of C1 and C2 (i.e. GROUP BY C1, C2) but only the tuples associated with the current maximum (i.e. MAX(SUM3)) need be temporarily stored. This reduces temporary table storage (i.e. "temping") requirements significantly while adding little additional runtime overhead.

Figure 4:
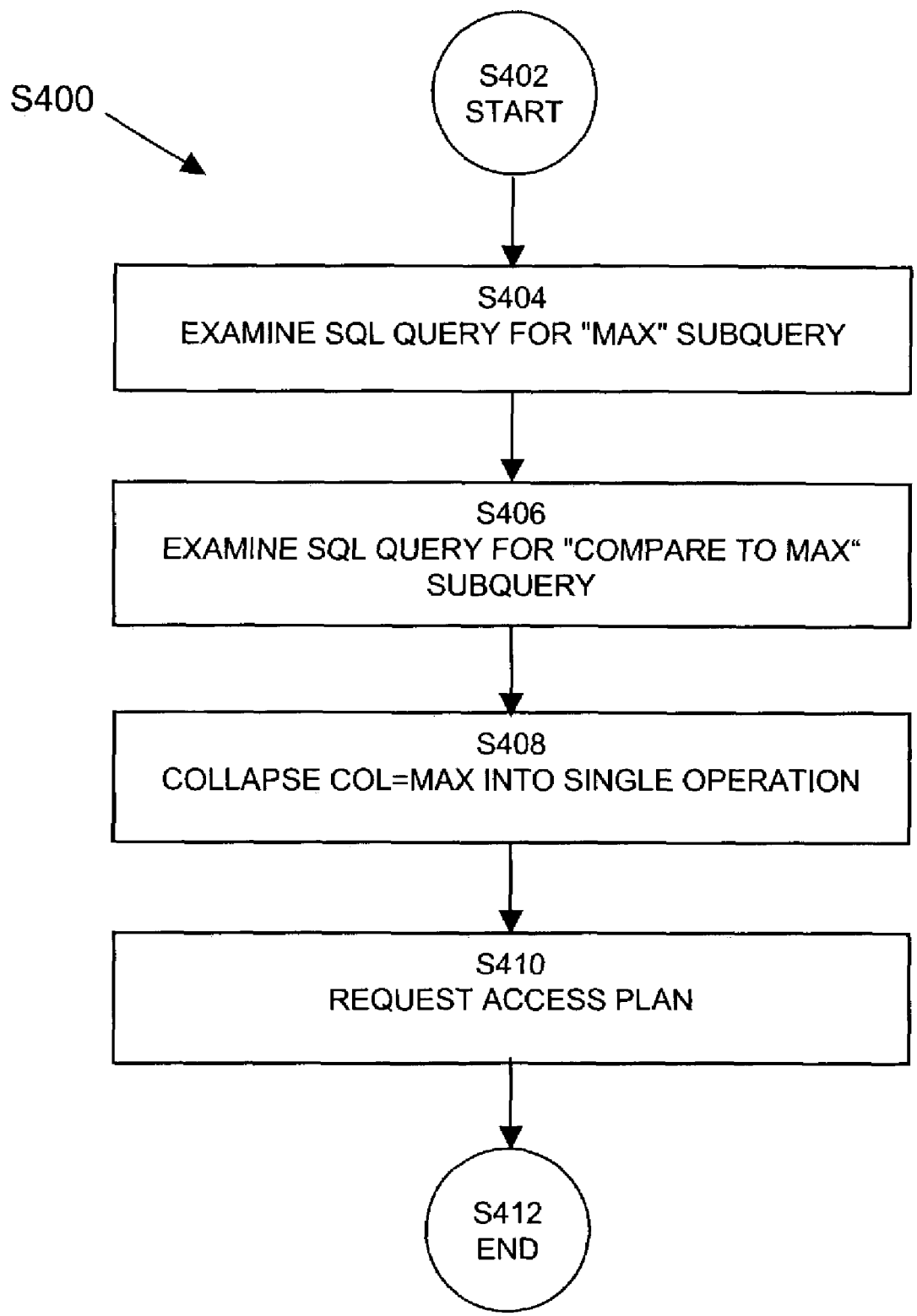
FIG. 4 is a flow chart illustrating operations of an optimizer module in accordance with the query optimization process of FIGS. 1 and 2.
Figure 5A:
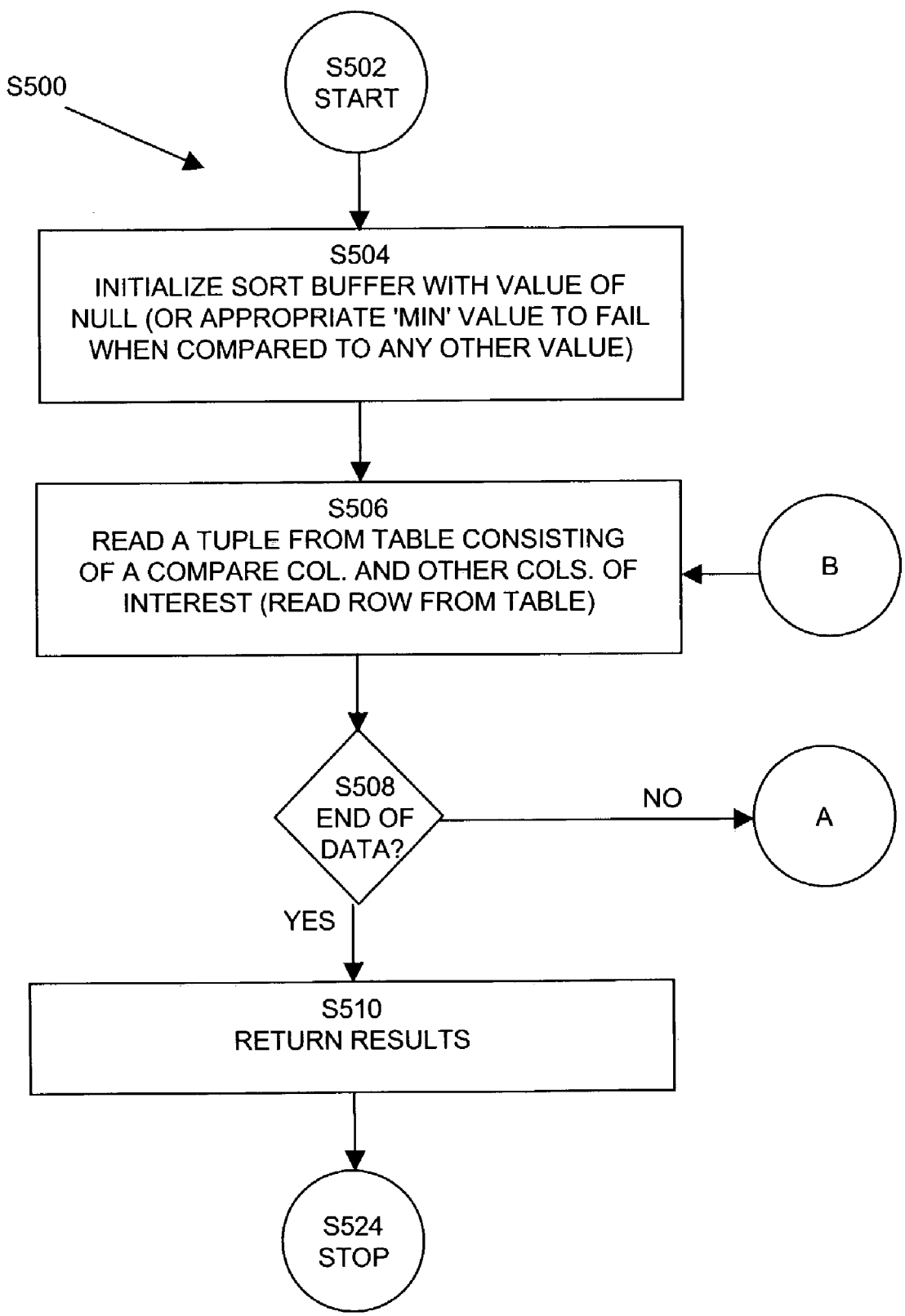
FIG. 5 is comprised of FIGS. 5A and 5B and represents a flow chart illustrating operations of a runtime system (interpreter) module in accordance with the query optimization process of FIGS. 1 and 2.
Figure 5B:
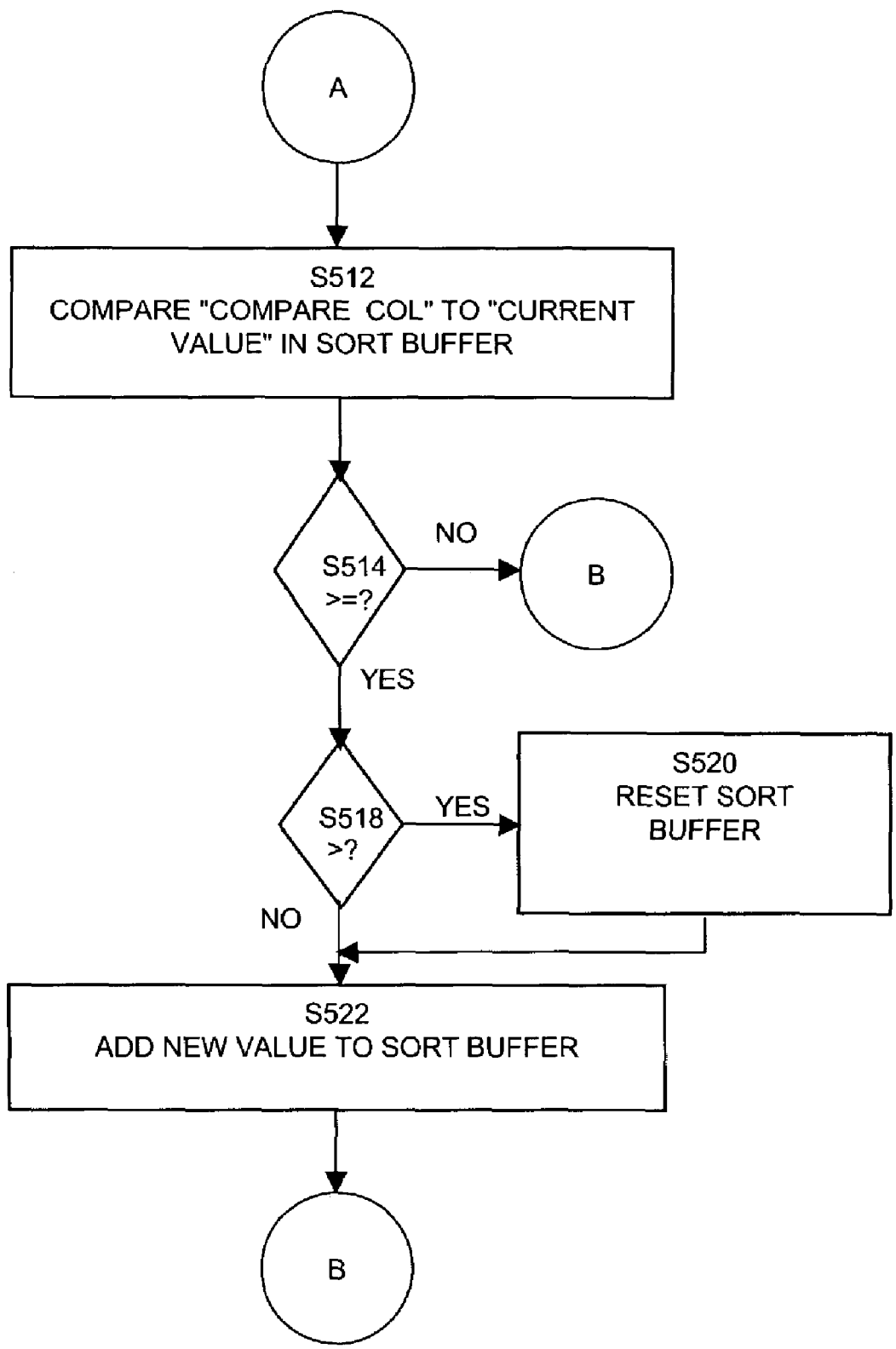

The query optimization process 200 will now be explained in more detail with reference to FIGS. 2, 4, 5A, and 5B. FIGS. 4, 5A, and 5B are flow charts illustrating the operations S400, S500 of the optimizer module 208 and runtime system (interpreter) module 216 of the query optimization process 200, respectively, in accordance with an embodiment of the invention.

Referring to FIG. 4, operations S400 of the optimizer module 208 start, at step S402, typically upon receiving a query 106 submitted by a user to the DBMS 104. At step S404, the query 106 is examined to determine if it contains an aggregation sub-query (e.g. SELECT MAX(C1) FROM T1). At step S406, the query 106 is examined to determine if the aggregation sub-query is contained in an aggregation predicate (e.g. C1=SELECT MAX(C1) FROM T1). At step S408, if both tests are met, the sub-query (e.g. SELECT MAX(Cl) FROM T1) of the aggregation predicate (e.g. C1=SELECT MAX(C1) FROM T1) may be effectively collapsed (e.g. C1=MAX(C1)). At step S410, a request to the code generation optimizer module 212 is made to produce an access plan 214 indicating that the query 106 is a candidate for processing in accordance with an aspect of the invention, that is, processing whereby the aggregation predicate may be effectively collapsed. At step S412, operations S400 end. Of course, operations S400 also check for applicable indices on the subject column C1 (not shown).

Referring to FIGS. 5A and 5B, at step S502 the operations S500 of the runtime system (interpreter) module 216 S500 start, typically upon receiving an access plan 214 from the code generation optimizer module 212. At step S504, a sort buffer is initialized with a null value (or an appropriate minimum value to fail when compared to a subsequent value). This value will be the "current value". At step S506, a row R1 (or tuple) is read from the table T1 410 comprising a "compare column" value (e.g. from column C1) and other column values of interest (e.g. from columns C2 and C3 as specified in the selection list of the SELECT query). At step S508, a determination is made whether the end of the column C1 (i.e. of the data) has been reached. If the end of the column is detected, then control is transferred to step S510. If the end of column C1 is not detected, then control is transferred to step S512. At step S510, the query result 110 of the query 106 is returned for display to the user. At step S524, operations S500 end.

If, the end of the column C1 was not reached, then the "compare column" and "current value" values are compared at step S512. At step S514, a determination is made as to whether the "compare column" value is greater than or equal to the "current value" value. If "compare column" is greater than or equal to "current value" then control is transferred to step S518. If "compare column" is less than "current value" then control is transferred back to step S506. At step S506, another row R2 is read from the table T1 410 and control is transferred to step S508 as explained above. At step S518, a determination is made as to whether "compare column" is greater than "current value". If "compare column" is greater than "current value" then control is transferred to operation S520. However, if "compare column" is not greater than "current value" then control is transferred to step S522. At step S520, the sort buffer (i.e. "current value") is reset. At step S522, a new value is added to the sort buffer and control is transferred back to step S506 as explained above.

While FIGS. 4, 5A, and 5B illustrate optimization of queries containing MAX aggregation functions, these processes may be readily configured to optimize queries containing MIN aggregation functions (i.e. replace "greater than" with "less than", etc.) as may be apparent to those persons of ordinary skill in the art.

While this invention is primarily discussed as a method, a person of ordinary skill in the art understands that the apparatus discussed above with reference to a computer-implemented database processing system may be programmed or configured to enable the practice of the method of the invention. Moreover, an article of manufacture for use with a data processing system, such as a pre-recorded storage device or other similar computer readable medium comprising program instructions recorded thereon may direct the data processing system to facilitate the practice of the method of the invention. It is understood that such apparatus and articles of manufacture also come within the scope of the invention.

It is to be understood that the specific embodiments of the invention that have been described are merely illustrative of certain application of the principle of the present invention. Numerous modifications may be made to the information retrieval system and method for optimizing queries having maximum or minimum function aggregation predicates invention described herein without departing from the spirit and scope of the present invention.

What is claimed is:

1. A method for optimizing a query, comprising:

evaluating the query to identify an aggregation predicate that contains an aggregation sub-query wherein the aggregation sub-query equates to-a selected column of a table wherein the aggregation sub-query applies an aggregation function to the selected column to return an aggregate value for the selected column, the aggregate value for selecting at least one row from the table to produce a query result, the aggregation function comprising one of a minimum function and a maximum function;

determining whether an index exists for the selected column of the table; and reforming the query in response to determining that an index does not exist for the selected column by replacing the aggregation sub-query with the aggregation function such that the selected column is effectively equated to the aggregation function wherein the reformed query is executed by a single pass of the table by storing a first temporary result that satisfies the aggregation function and replacing the first temporary result with a second temporary result in response to determining that a second temporary result satisfies the aggregation function in relation to the first temporary result.

2. The method of claim 1 wherein the aggregation function is processed as a sort function on the selected column such that the sort function scans the table only once to provide the query result and wherein the sort function comprises:

comparing in accordance with the aggregation function, a first column value and a second column value from the column of a first row and a second row respectively of the table; and selecting at least one of the first row and second row for the query result in response to comparing the first column value and the second column value.

3. The method of claim 2 wherein the sort function further comprises:

further comparing, in accordance with the aggregation function, a next column value from the column of a next row of the table and a query result column value from the column of a row of the query result; and further selecting the next row to add to the query result or replace the query result in response to comparing the next column value.

4. The method of claim 3 further comprising repeating the steps of further comparing, and further selecting for any remaining next rows of the table.

5. The method of claim 1 wherein the query comprises a selection list for choosing columns of the table to comprise in the query result.

6. The method of claim 5 wherein the selection list comprises the column.

7. The method of claim 1 wherein the table is a set of tuples.

* * * * *